United States Patent
Shapiro et al.

(10) Patent No.: US 11,425,919 B2
(45) Date of Patent: Aug. 30, 2022

(54) BOUNCING/ACTIVE ICE CREAM MAKER

(71) Applicants: Joseph Morris Shapiro, Provo, UT (US); Nolan Tracy Crook, Provo, UT (US)

(72) Inventors: Joseph Morris Shapiro, Provo, UT (US); Nolan Tracy Crook, Provo, UT (US)

(*) Notice: Subject to any disclaimer, the term of this patent is extended or adjusted under 35 U.S.C. 154(b) by 0 days.

(21) Appl. No.: 15/666,332

(22) Filed: Aug. 1, 2017

(65) Prior Publication Data

US 2018/0027840 A1 Feb. 1, 2018

Related U.S. Application Data

(60) Provisional application No. 62/369,744, filed on Aug. 1, 2016.

(51) Int. Cl.
*A23G 9/24* (2006.01)
*A23G 9/22* (2006.01)
*A23G 9/08* (2006.01)

(52) U.S. Cl.
CPC .............. *A23G 9/224* (2013.01); *A23G 9/08* (2013.01)

(58) Field of Classification Search
CPC .......... A23G 9/08; A23G 9/224; A23G 9/086; A23G 9/22; F25D 31/00; F25D 31/002
See application file for complete search history.

(56) References Cited

U.S. PATENT DOCUMENTS

| | | | | |
|---|---|---|---|---|
| 5,857,351 | A  * | 1/1999 | Angus | A23G 9/08 366/130 |
| 2005/0183446 | A1* | 8/2005 | Fuchs | A45C 11/20 62/457.7 |
| 2007/0023439 | A1* | 2/2007 | Vaughn | F25D 3/08 220/592.03 |
| 2015/0225164 | A1* | 8/2015 | Seiders | B65D 81/3858 220/592.25 |
| 2015/0253067 | A1* | 9/2015 | Bucceri | A23G 9/12 62/66 |

* cited by examiner

*Primary Examiner* — Stephen J Castellano
(74) *Attorney, Agent, or Firm* — Strong & Hanni, P.C.; Joseph Shapiro (57) ABSTRACT

A method and device for making ice cream, the device comprising an outer shell with a closeable opening, a closeable inner shell. The outer shell and inner shell may be rigid or flexible. The outer shell may be made from TPU. The inner shall may be made from a foodsafe material such as polyethylene. A method for making ice cream comprising adding ice cream mixture to an inner shell; closing the inner shell; adding ice and salt to an outer shell; inserting the inner shell into the outer shell; closing the outer shell; and bouncing the outer shell on a trampoline.

11 Claims, 13 Drawing Sheets

BOUNCING/ACTIVE ICE CREAM MAKER

This application claims domestic priority benefit to U.S. provisional application No. 62/369,744 filed 1 Aug. 2016.

BACKGROUND OF THE INVENTION

People love ice cream. Ice cream is usually obtained from a store or other outlet where it is pre-made, but it is actually quite easy to make without special machines or ingredients. In general, making ice cream requires only a mixture of cream, milk, and sugar (many variations are possible and well-known), keeping the mixture cold, and mixing or shaking it. Although children, and people in general, often engage in active play, such as jumping on a trampoline or otherwise, heretofore there has not been a good way to harness the active play or activity to mix or shake the ice cream mixture. What is needed is a good way, system, or method for harnessing active play or activity, such as jumping on a trampoline, to make ice cream.

BRIEF SUMMARY OF THE INVENTION

A method and system are disclosed for making ice cream. In one embodiment, an outer shell is filled with ice and salt. One or more inner shells or containers are filled, or partially filled, with an ice cream mixture (usually based on cream, milk, and sugar), and then sealed. The outer shell and inner shell(s) may be soft, which may promote safety in activity, especially when bouncing the outer shell on a trampoline. The outer shell is sealed. After sufficient shaking, e.g., through bouncing on a trampoline, the inner shell(s) are removed from the outer shell, and the ice cream may be removed from the inner shell(s) and consumed.

DETAILED DESCRIPTION OF THE INVENTION

This Application claims priority to U.S. Provisional Application No. 62/369,744, titled "Bouncing/Active Ice Cream Maker," filed on Aug. 1, 2016, and which is incorporated herein by reference.

A system, apparatus, and method for making ice cream using a bouncing apparatus is disclosed. In one embodiment, as shown in FIGS. 1-4, an ice cream maker 100 comprises an outer shell 110 for holding ice and salt 130$a$-$n$, and an inner shell 150 for holding ice cream mixture 160 that eventually becomes ice cream. In one embodiment, inner shell 150 is at least partially filled with an ice cream mixture 160, sealed, and placed inside outer shell 110. Outer shell 110 is at least partially filled with ice and salt 130$a$-$n$, and then sealed with the ice and salt 130$a$-$n$ and inner shell 150 contained inside. Outer shell 110 may then be bounced or shaken to make ice cream. In one preferred embodiment, depending on factors including but not limited to size and shape of inner shell 150 and outer shell 110, the amount of ice and salt 130$a$-$n$, the amount of ice cream mixture 160, and outside temperature, it may take 10-30 minutes of shaking or bouncing to make ice cream, i.e., before the ice cream mixture becomes ice cream. In a one embodiment, shaking, bouncing, and/or mixing is accomplished by bouncing the outer shell on a trampoline. The shaking, bouncing, and/or mixing could also be accomplished in other ways, including but not limited to throwing, kicking, playing in a swimming pool or other ovate or any other means for bouncing, shaking, mixing or some combination thereof.

In one embodiment, outer shell 110 may be a sphere approximately 12.0 inches in diameter. Outer shell 110 may be other shapes or sizes. For example, outer shell 110 may be a cube, or may be flexible such that the shape changes. Various shapes have various advantages. For example, a cube is uniform and may therefore bounce randomly, which may be advantageous in some situations, circumstances, or games, e.g., trying to dodge the bouncing cube. Different sizes may be appropriate depending on: the volume of ice cream to be made, the size and age of people bouncing and shaking the ice cream, the amount of empty volume in outer shell 110, or other reasons which will be appreciated by a person or ordinary skill.

In another embodiment, outer shell 110 may be a flexible or soft shape, such as a beach ball or disk shape. In one embodiment, such outer shell may be approximately 12 inches in diameter. An exemplary soft outer shell embodiment is shown in FIGS. 5-9.

Outer shell 110 may be rigid, flexible, partially rigid, and/or flexible. For example, outer shell 110 may be fully flexible, such as the material used to make a beach ball, or may be fully rigid, such as a hard plastic material such as the material used for plastic jugs of protein powder or similar products and applications. The material for outer shell 110 may also be partially flexible and/or rigid, or may have some portions with a different rigidity than other portions. Flexible materials may be safer in bouncing situations, but also may not bounce as well or may be more difficult to throw, catch, and otherwise manipulate. Rigid materials for outer shell 110 may bounce better but may be more dangerous because of the hardness. A rigid outer shell 110 may also be easier to throw, catch, or otherwise manipulate.

Outer shell 110 may be made out of many materials well known in the art, including but not limited to plastic, rubber, plastisol, polyethylene, TPU (thermoplastic polyurethane) and many variations and brands of such products. In one embodiment, outer shell 110 may be made of 0.3 mm TPU. It should be appreciated that different thicknesses of material may be used. In general, as thickness decreases, outer shell 110 may become less strong, less durable, less resistant to tear and puncture, more flexible, and more translucent. As thickness increases, outer shell 110 may become stronger, more durable, more resistant to tear and puncture, less flexible, and less translucent.

In one embodiment, outer shell 110 may be made of phthalate free plastisol that is approximately 0.25 inches thick. The material for outer shell 110 does not have to be food safe because it will not come in contact with the ice cream 160, but will come in contact only with ice and salt 130a-n, which be discarded and not consumed.

In one embodiment, outer shell 110 may be made out of materials such as the rubber bladder of a soccer ball, such as the rubber bladder of a size 4 soccer ball.

In one embodiment, outer shell 110 may be made from a flexible foam of polyurethane material of approximately 2 lb density. The flexible foam may be lined on the interior with a thick flexible inner TPU shell, approximately 2 mm thick, for a water-tight seal. The combination of the inner lining and foam material may have a combined thickness of approximately 1.0 inches. Other materials of differing flexibility and thicknesses may be used for the interior lining and the exterior foam. The exterior foam and the interior lining may form a water-tight seal with closeable opening 140 which may use a cap 145, screw-on cap 145, clamp, zipper, ties, squeezing mechanism or any other liquid-tight means. A person of ordinary skill will appreciate that the density and thickness of the outer material and the thickness of the inner material may be modified or adjusted.

Outer shell 110 may be transparent, translucent, solid-colored, or colored with patterns, shapes, or words. A transparent or partially transparent outer shell 110 may be desirable in some circumstances because it may be fun and interesting to see what is happening with the ice and salt 130a-n, and inner shell(s) 150 with ice cream mixture 160, and it may also be convenient for monitoring the progress of making the ice cream. Many colors, patterns, images, words, logos, trademarks, and levels of opacity may be applied to outer shell 110.

In a one embodiment, outer shell 110 has a closeable opening 140 for inserting and removing ice and salt 130a-n, and also for inserting and removing inner shell(s) 150 containing ice cream mixture 160. The size and shape of closeable opening 140 may vary. In general, closeable opening 140 will be more convenient if it is large enough to easily insert and remove ice and salt 130a-n and the inner shell(s) 150, but small enough that most of outer shell 110 can be filled without the contents falling out of closeable opening 140. In one embodiment, closeable opening 140 in outer shell 110 may be a circle approximately 3.0 or 3.5 inches in diameter. The opening size of closeable opening 140 may vary depending on the size of outer shell 110 and other factors.

Closeable opening 140 may close and open in a variety of ways well known in the art. In one embodiment, closeable opening 140 may have a circular plastic cap 145 that screws into or onto threads onto outer shell 110. Closeable opening 140 may also use zippers, clamps, nuts and bolts, an expanding gasket, a self-sealing fold-over material, ties, a wire bail lid (as often used for food canning/jarring applications, or any other means known in the art.

In another embodiment, closeable opening 140 may comprise an expanding gasket mechanism, or cap, 300, as shown in FIGS. 9-13. Expanding gasket cap 300 may be configured to pull a gasket 310 over a form 320 that tapers outward, thereby creating a seal. For example, closeable opening 140 may include a female circular receiving hole with a short cylinder at the top. A male cap 300 may have a substantially complementary size and shape, but may be flared outward at form 320 where the corresponding cylinder is located on closeable opening 140. Male cap 300 may include a rubber, silicone, plastic (or other material) gasket 310, the shape of which may substantially track the opening in closeable opening 140. Male cap 300 may include a mechanism for pulling gasket 310 upward (and outward of over the flared tube element 320), to create a seal.

Figure 1:
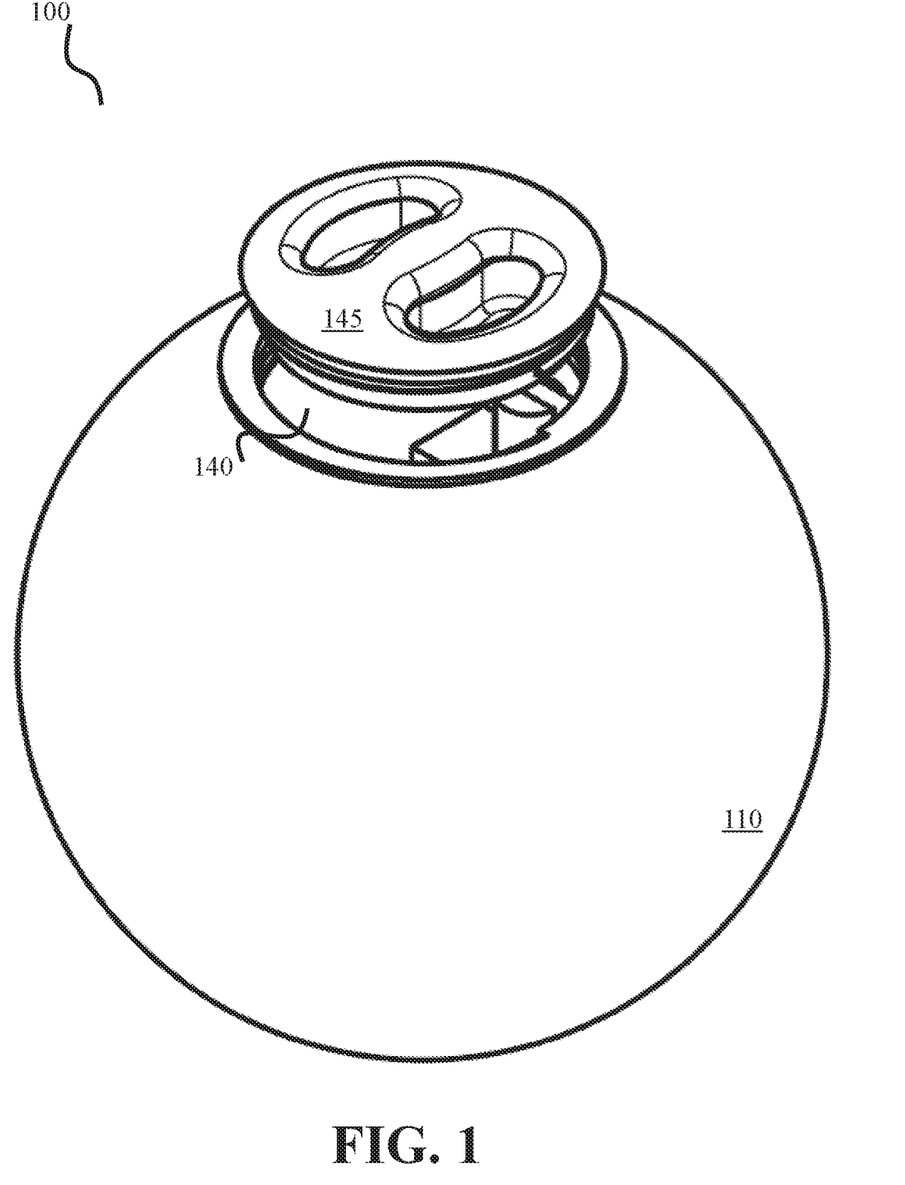
FIG. 1 shows an elevated view of an exemplary embodiment of a hard-shell ice cream maker.
Figure 2:
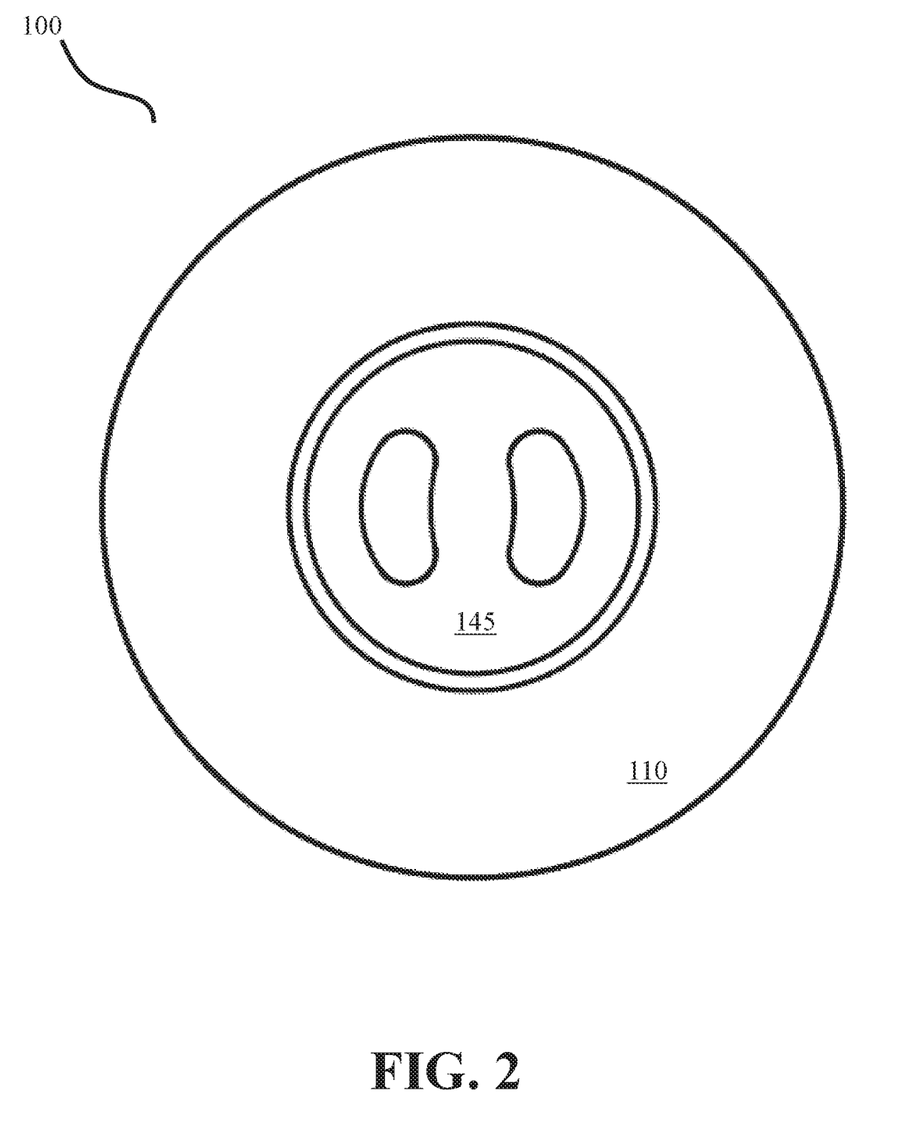
FIG. 2 shows a top-down view of an exemplary embodiment of a hard-shell ice cream maker.
Figure 3:
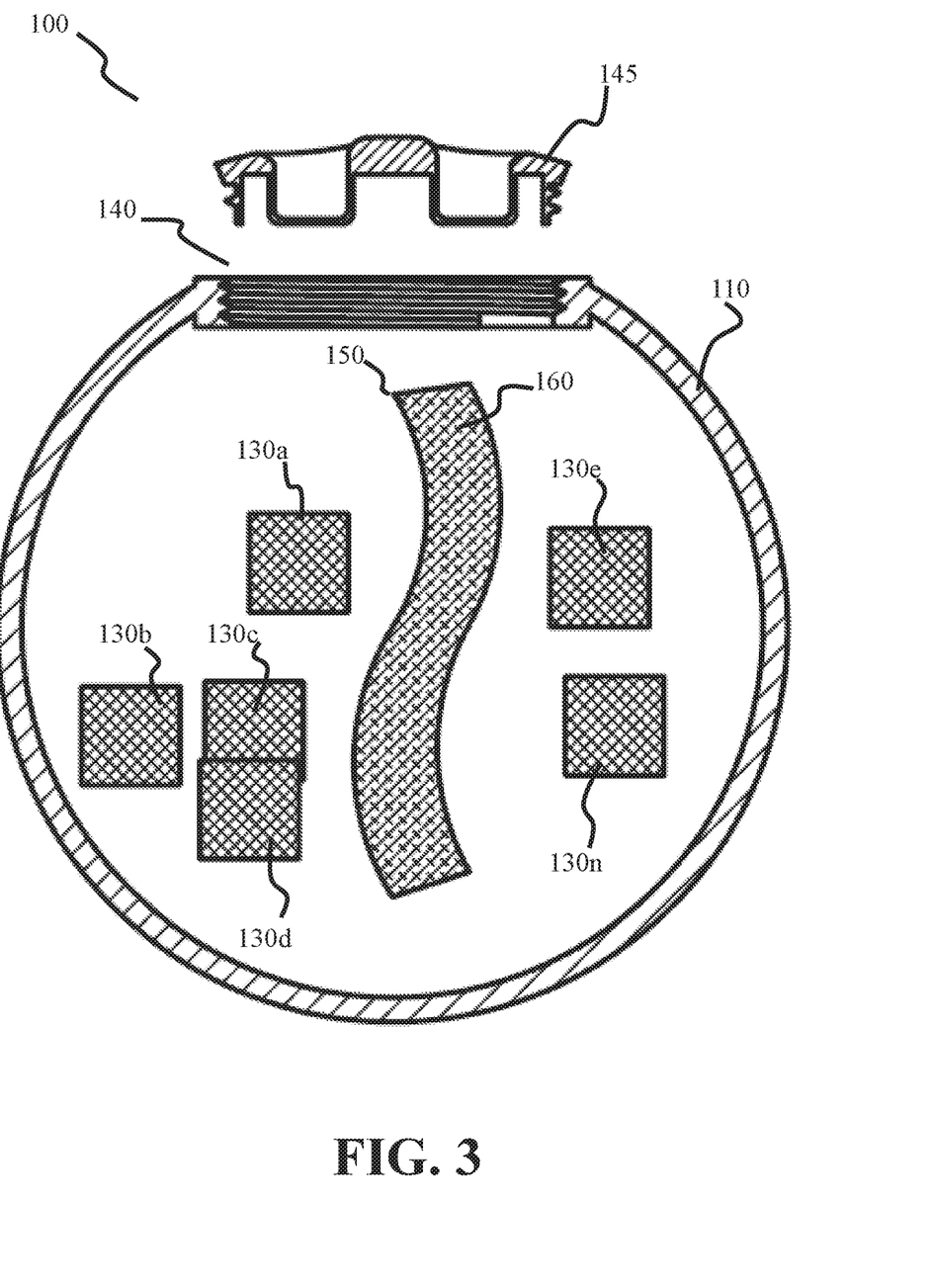
FIG. 3 shows a cross section view of an exemplary embodiment of a hard-shell ice cream maker.
Figure 4:
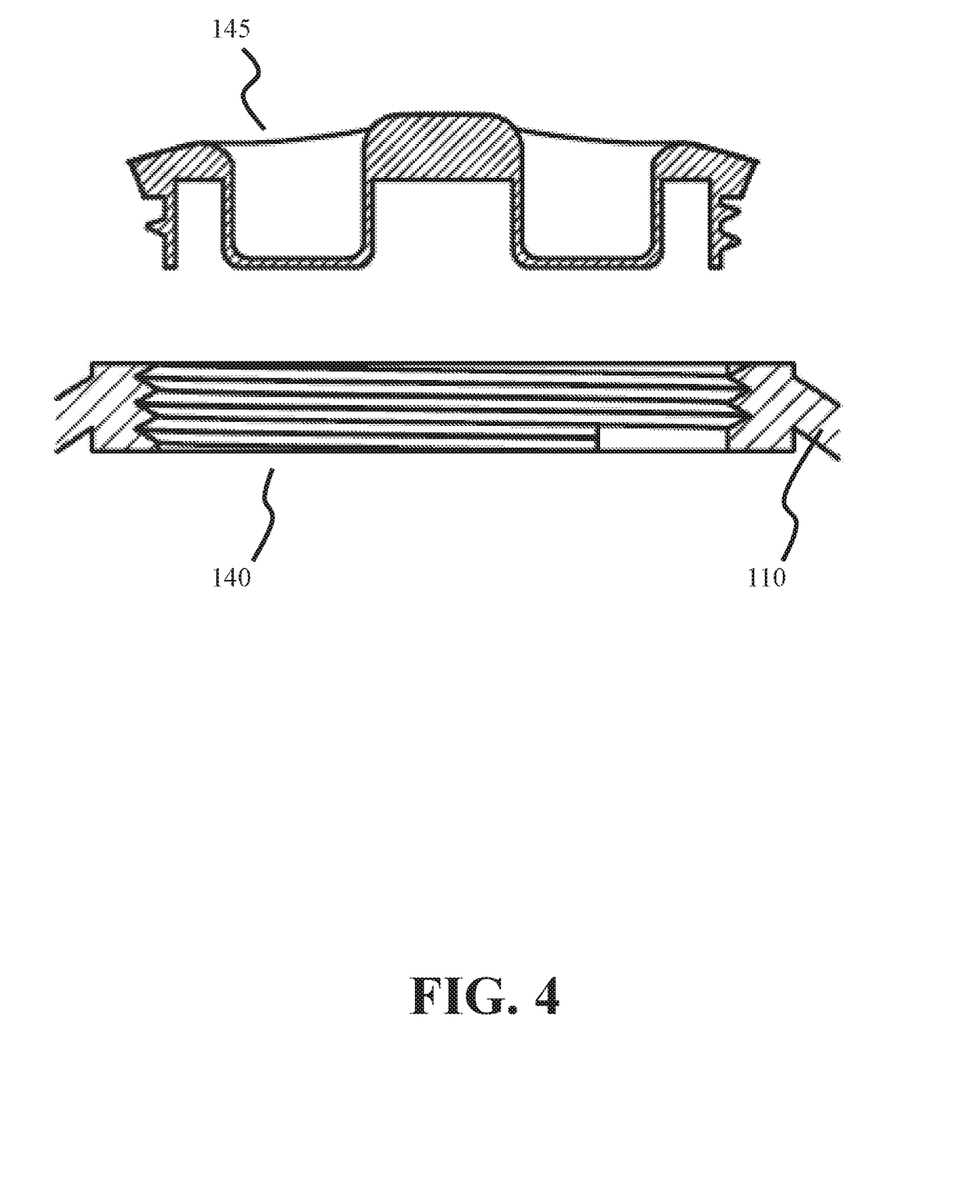
FIG. 4 shows a close-up cross section view of the cap of an exemplary embodiment of a hard-shell ice cream maker.
Figure 5:
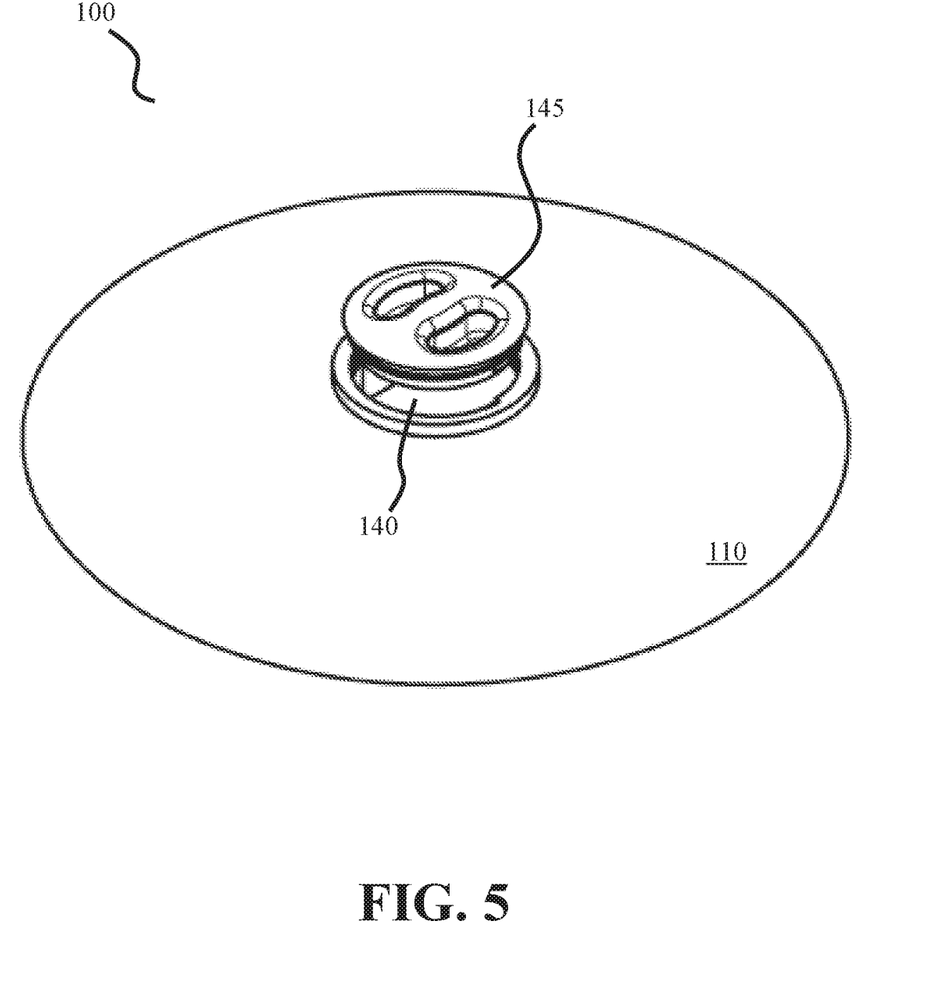
FIG. 5 shows an elevated view of an exemplary embodiment of a soft-shell ice cream maker.
Figure 6:
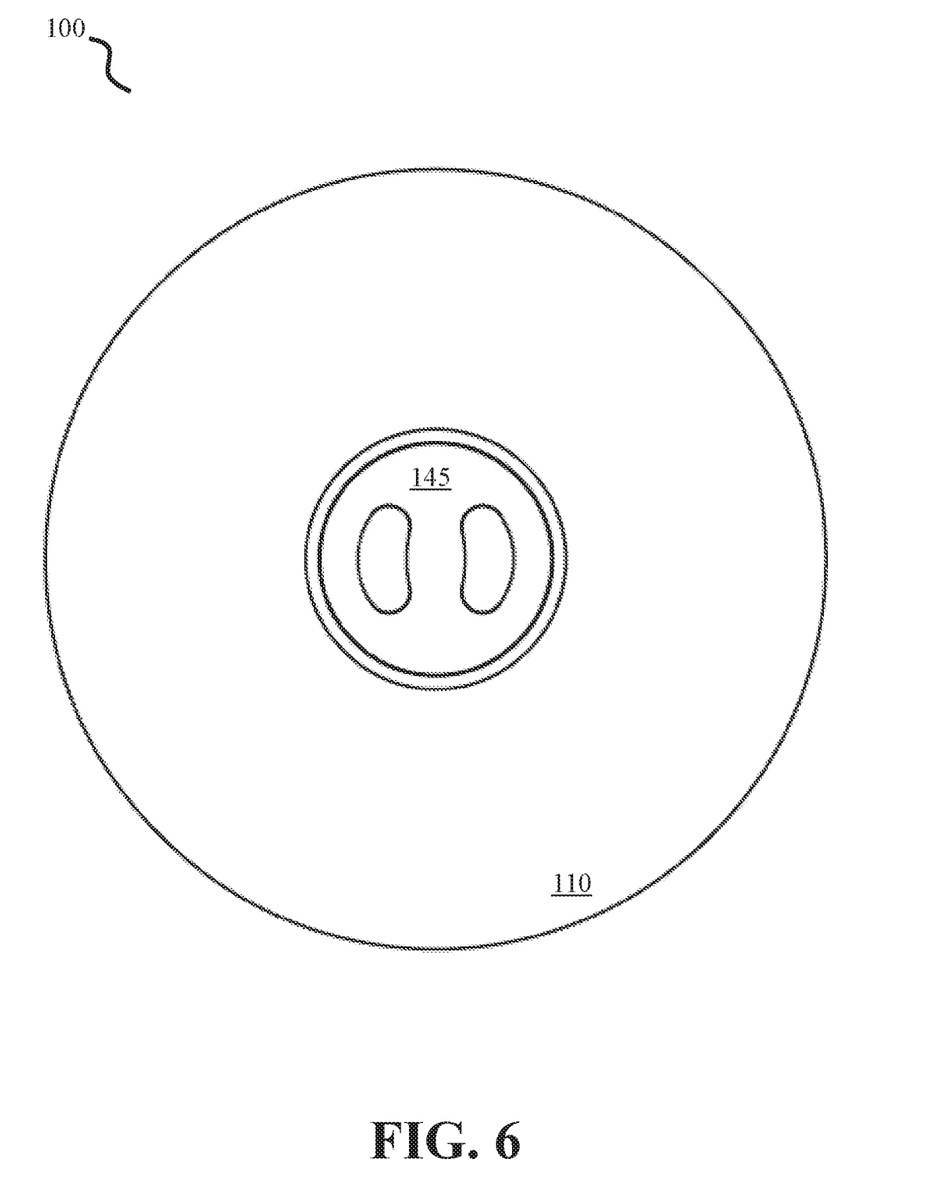
FIG. 6 shows a top-down view of an exemplary embodiment of a soft-shell ice cream maker.
Figure 7:
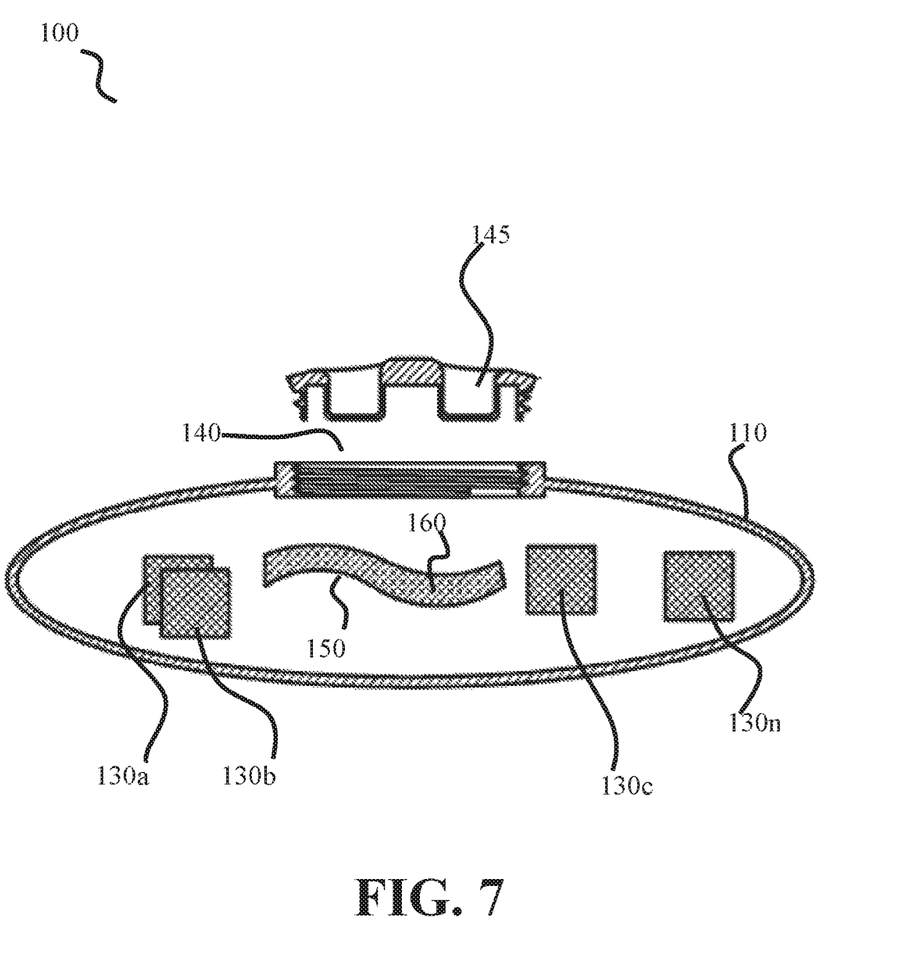
FIG. 7 shows a cross section view of an exemplary embodiment of a soft-shell ice cream maker.
Figure 8:
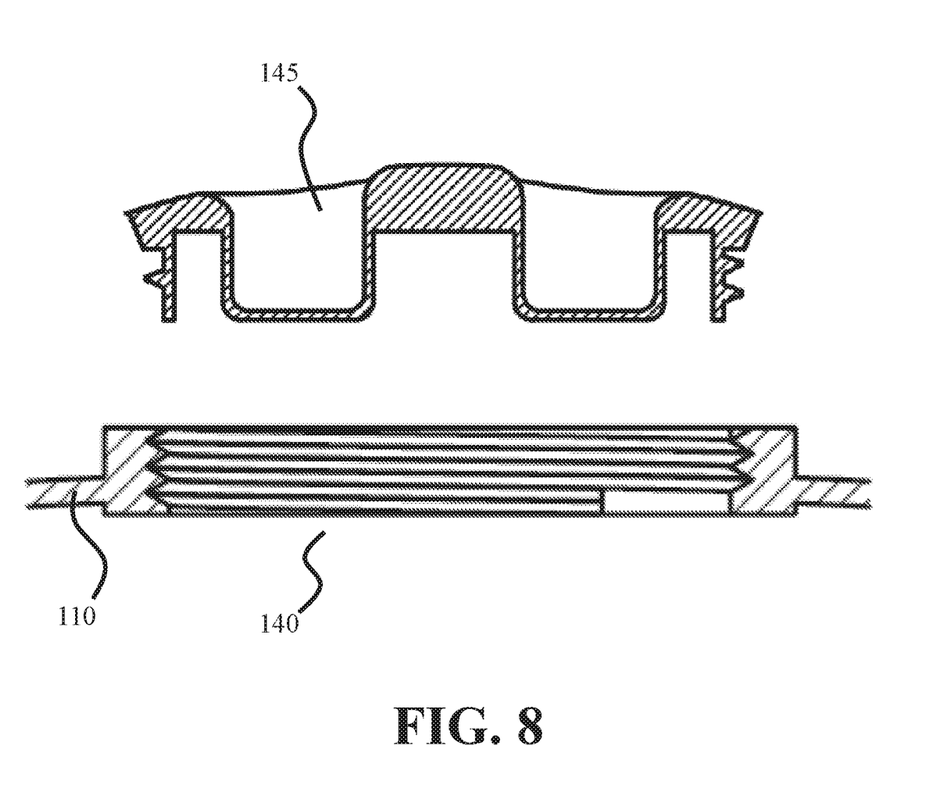
FIG. 8 shows a close-up cross section view of the cap of an exemplary embodiment of a soft-shell ice cream maker.
Figure 9:
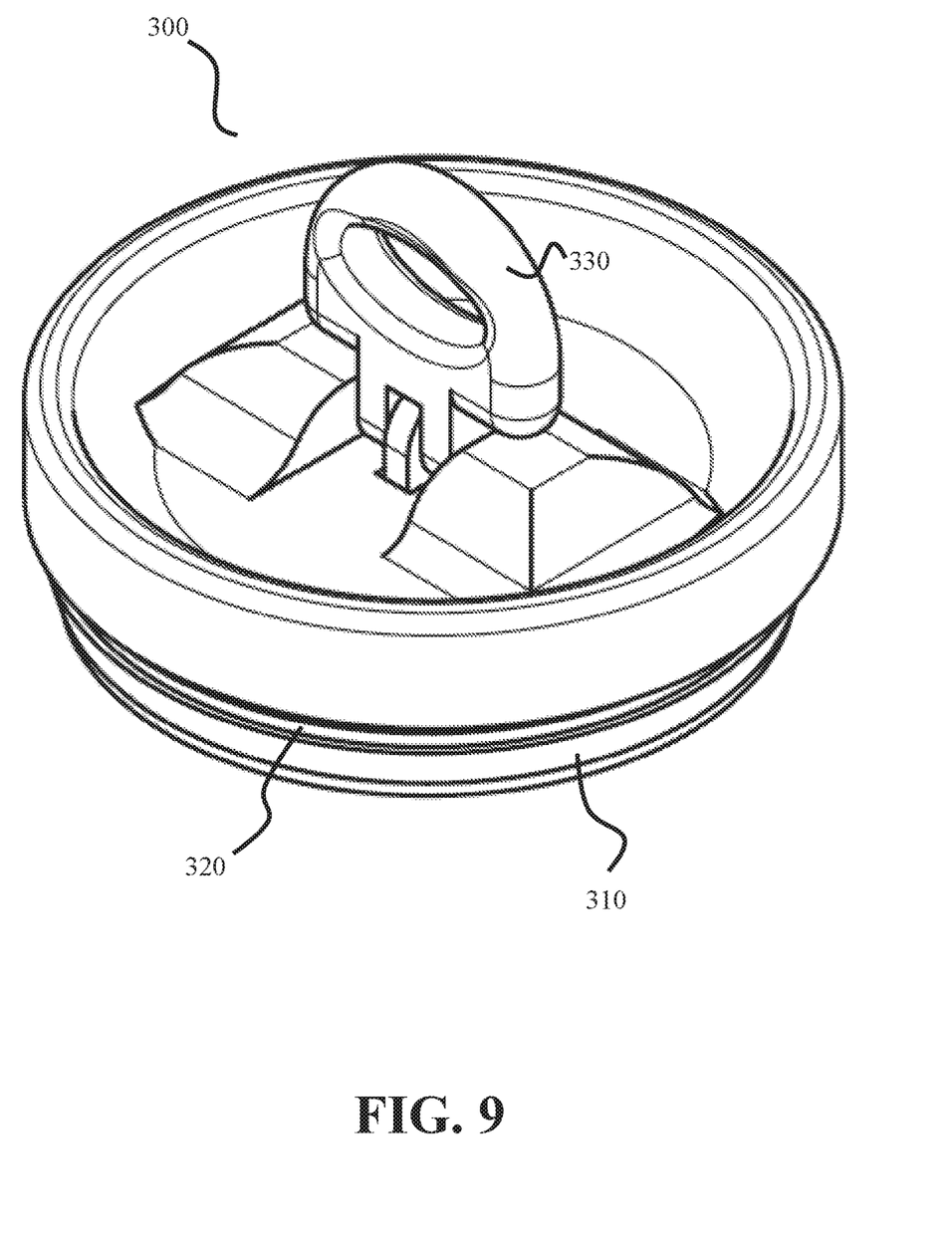
FIG. 9 shows an elevated view of a gasket-expanding cap in an open configuration.
Figure 10:
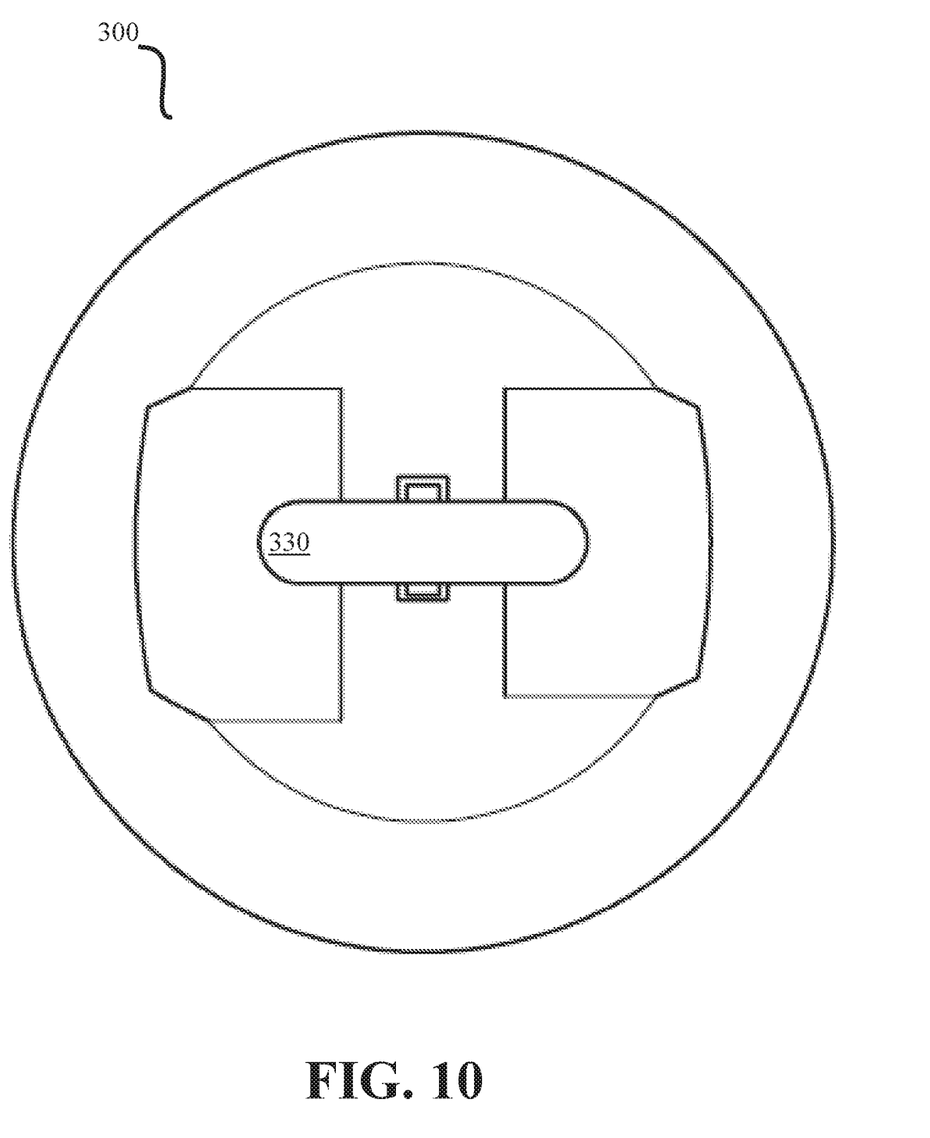
FIG. 10 shows a top-down view of a gasket-expanding cap in an open configuration.
Figure 11:
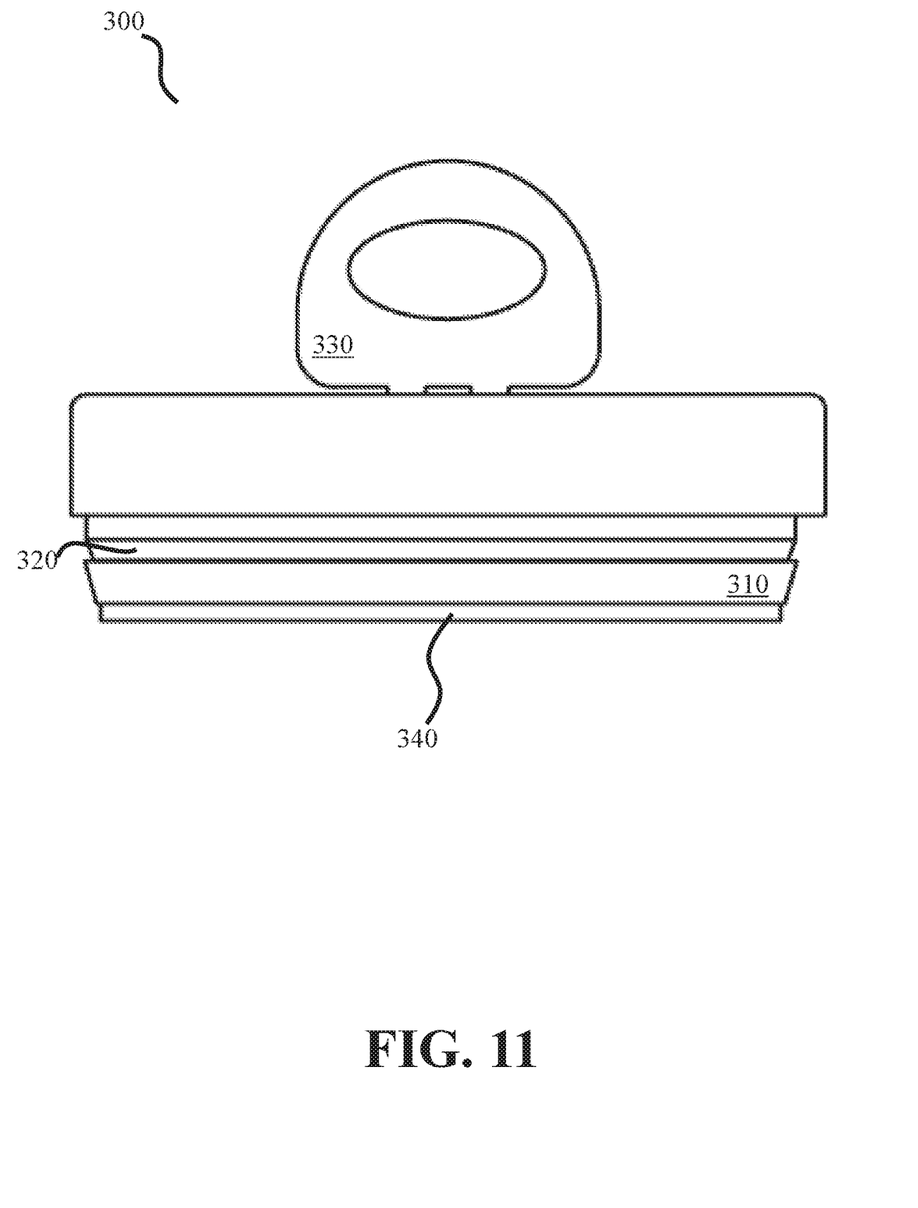
FIG. 11 shows a cross section view of a gasket-expanding cap in an open configuration.
Figure 12:
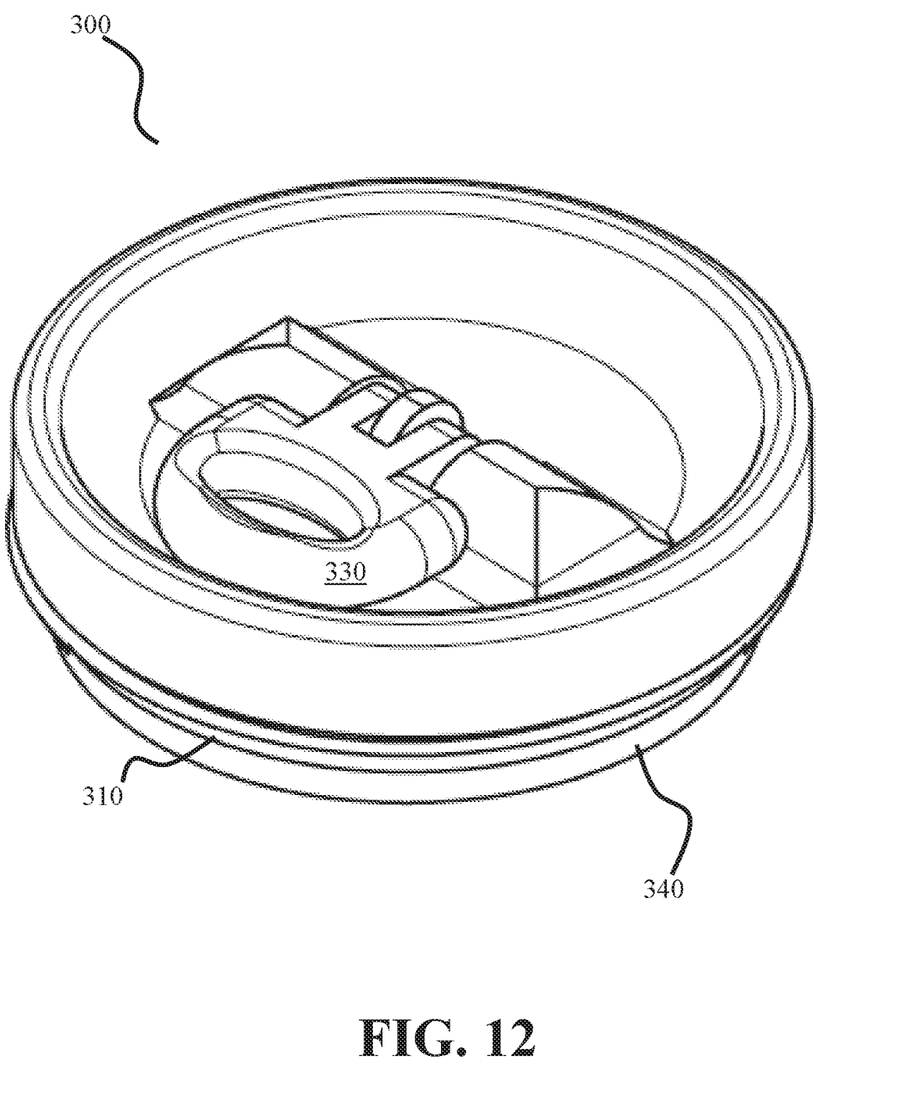
FIG. 12 shows an elevated view of a gasket-expanding cap in a closed configuration.
Figure 13:
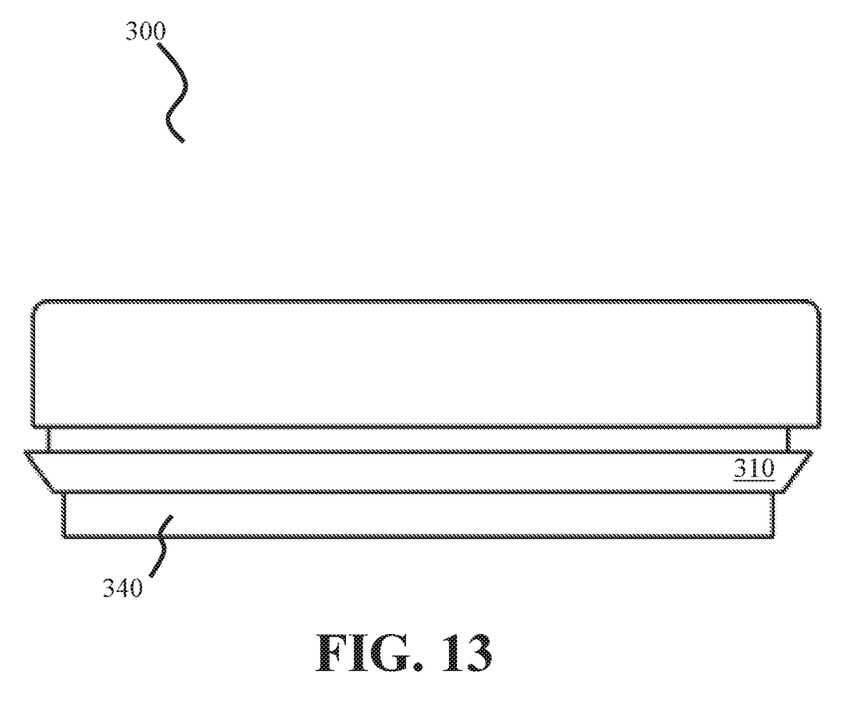
FIG. 13 shows a cross section view of a gasket-ex riding cap in a closed pa configuration.

In one embodiment, the mechanism in male cap 300 for pulling gasket 310 up and over flared form 320 may comprise a lever 330 which is mechanically connected to bottom plate 340 so that when lever is manipulated from the open position, as shown in FIG. 11, to the closed position, as shown in FIGS. 12-13, bottom plate 340 is pulled upward, thereby forcing gasket 310 to expand over flared form 320. When gasket 310 expands, it is mechanically pressed into cylindrical opening on closeable opening 140, thereby creating a seal.

In another embodiment, closeable opening 140 may be covered by a piece of TPU or other material secured in place with a rubber band, or elastic strap, or tightened band.

The closing materials or hardware that are part of outer shell 110 (i.e., a removable cap or other part), may be bonded, sealed, mechanically attached, or otherwise attached to the outer shell in many ways well-known in the art. In general, the method or solution for bonding the closeable materials parts to the outer shell, or manufacturing the closeable opening parts as part of outer shell 110, will depend on the materials for outer shell 110 and closeable opening parts. Glue, adhesives, mechanical seals, heal welding, and sonic welding are some exemplary solutions for securing to the outer shell.

In one embodiment, it may be possible to add air to outer shell 110. For example, outer shell 110 may be similar to a beach ball or a sporting ball bladder, having a nozzle or valve for adding or removing air. Adding or removing air may change the characteristics of outer shell 110 for bouncing, shaking, throwing, kicking, or otherwise manipulating the outer shell.

To make ice cream, ice and a solute, e.g., rock salt, may be inserted into outer shell 110 through closeable opening 140. The ice may be made from water, or water with additives, or any other solvent material or composition that may have desirable properties for a particular application. In a preferred embodiment, the ice is made from water. The solute may be one of many different types of salts or other solutes depending on particular applications and desired outcomes. In general, different types of salts may change the freezing properties of an ice/water mixture, as will be well understood by a person of ordinary skill. Common types of salts used include the chemicals $NaCl$ and $CaCl_2$. The dissolving of these salts causes the dissociation of two or three ions into the liquid water solvent, respectively, which in turn decreases the freezing temperature of the solvent. This permits the liquid solvent to exist in a liquid phase below s solute-free freezing temperature. These lower temperatures allow for the formation of ice cream in the inner shell(s), where ice cream forms at temperatures below zero degrees Celsius. In a preferred embodiment, a salt product of the chemical formula NaCl such as "ice cream salt," or "Morton® Ice Cream Salt," or "rock salt," or similar products may be used. The ratio of ice to salt, and the amount of ice and salt, may affect cooling and freezing times. The percentage of salt mass to ice mass may range from 0 to 25% depending on the desired freezing temperature of the solvent, or other reasons which will be appreciated by a person or ordinary skill. The freezing point of water at these solute levels may range from 0 degrees Celsius to −21 degrees Celsius, respectively. In a preferred embodiment, the mass ratio of ice to salt may be 10%, corresponding to freezing temperature of approximately −10 degrees Celsius. In general, the amount of ice and salt in outer shell 110 should be sufficient so that the as much as possible of the surface area of inner shell 150 remains in contact with the ice/salt mixture. In general, ice cream mixture 160 will freeze and become ice cream more quickly according the amount of the surface area of inner shell 150 that remains in contact with the ice/salt mixture.

Inner shell 150 may also be referred to as the "ice cream container." In a preferred embodiment, inner shell 150 is filled, or partially filled, with an ice cream mixture. Many recipes are well known for making ice cream. One exemplary recipe comprises two parts cream, one part whole milk, and salt, sugar, and vanilla to taste. As is well-known in the art, softness or other characteristics of ice cream may vary depending on sugar content or other factors.

Inner shell 150 is preferably made from a food safe material and has a closeable opening for inserting ice cream mixture and removing ice cream. Inner shell 150 may be rigid or flexible, and may have various shapes, colors, opacities, and means for opening and closing.

For example, in one embodiment, inner shall 150 may be made from vinyl tubing Wall thickness may vary, but should be thick enough to be durable but thin enough to remain flexible. For example, the vinyl tubing may be ¾" inner diameter, or 1" inner diameter, and the wall thickness may be approximately ⅛". Other diameters and wall thicknesses will be appropriate for various circumstances. The vinyl tubing may have different lengths depending on size of outer shell 150, number of inner shells 150 in outer shell 110, desired serving size, size of closeable opening 140 in outer shell, etc.

Vinyl tubing, or tubing in general, may have several advantages. For example, the surface area to volume ratio of tubing is high, which makes it more likely that all the ice cream mixture will be frozen into ice cream. In some instances, ice cream mixture that is not near the inner surface of an inner shell 150 may not get sufficiently cold to fully become ice cream (although this phenomenon may be desirable for some applications). Also, removing ice cream from vinyl tubing is convenient because it may be simply squeezed out, without using any utensils or other tools or implements. Vinyl tubing may be closed with clamps, barbs, plugs, heat sealing, glue, adhesive, or any other way known in the art. As is also known in the art, the vinyl tubing may be folded over for clamping purposes or to otherwise further facilitate closing and sealing.

In general, the material for the inner shell may be plastic, rubber, one or many types of plastic, vinyl, or any other material into which an ice cream mixture may be inserted. Glass may also be used, but glass may be dangerous because of the breaking hazard while being bounced and shaken.

The inner shell may be flexible, rigid, or somewhere between on the continuum of rigidity. In general, a flexible material may be safer if the outer shell is being bounced on a trampoline, thrown, kicked, etc. In general, shapes with high ratios of surface area to volume generally result in faster and more uniform freezing of the ice cream. As with the outer shell, the closeable opening may use a cap, screw-on cap, clamp, zipper, ties, squeezing mechanism or any other liquid-tight means.

In one embodiment, inner shell 150 may be a plastic tube similar to an Otter Pop®, and may be factory sealed, tied like a balloon, sealed like a Ziploc® bag, or closed in any other way known in the art. In one embodiment, the plastic tube may be 2" polyethylene tubing with a wall thickness of 2 mm. The thickness of the polyethylene may be increased or decreased. In general, the thicker the polyethylene, the more resistant to failure, tearing, and bursting. The size of the polyethylene tubing may vary from 2 inches depending on the needs, requirements, or characteristics of a particular application. Thicker tubing walls may decrease heat transfer between the ice solution in the outer shell and the ice cream mixture in the inner shell.

The inner shell(s) may be disposable or reusable.

In one embodiment, it may be desirable to leave a portion of inner shell 150 empty, i.e., free from ice cream mixture 160 and from air or other substance. This gives inner shell 150 the ability to be folded over and compacted during the turbulence of shaking or bouncing, without exploding as the pressure increases because of decreasing interior volume as inner shell 150 is folded over and compacted.

Also, as discussed above, the wall thickness of inner shell 150 is generally thick enough for durability, but thin enough for heat transfer and to improve flexibility where flexibility is required.

More than one inner shell 150 may be placed in the outer shell. In general, the only limit is space in outer shell 110 and whether the ice/salt to ice cream mixture will remain high enough for freezing.

In one embodiment, instead of using reusable inner shells 150, pre-filled and sealed ice cream mixtures may be acquired and simply placed into outer shell 110 with the ice/salt mixture 130a-n for making ice cream. In one embodiment, these pre-filled and sealed ice cream mixtures may be a small plastic flexible tube, e.g., as is well-known for Otter Pops® popsicles. Using such disposable inner shells 150 increases convenience for a user of this invention, and also ensures a good ice cream mixture and recipe.

This invention could be used for foods other than ice cream, although ice cream is one of the moat beneficial uses of this invention.

What is claimed is:

1. A device for making ice cream, comprising:
an outer shell comprising an outer-shell closeable opening; and
a flexible inner shell comprising an inner-shell closeable opening;
wherein:
the outer-shell closeable opening is independent from the inner-shell closeable opening such that interior space of the outer shell is accessible for inserting contents that are in physical contact with the inner surface of the outer shell and the outer surface of the inner shell; and
the outer shell is configured to be sufficiently large to enclose the entirety of the inner shell when the outer-shell closeable opening is in a closed state; and
the outer shell and inner shell are configured so that when the inner shell is entirely enclosed in the outer shell and the outer shell is in a closed state, at least one point on the inner shell is not in a fixed location relative at least one point on the outer shell.

2. The device of claim 1, wherein the outer shell is rigid.

3. The device of claim 1, wherein the outer shell is flexible.

4. The device of claim 1, wherein the outer shell is made, at least in part, from TPU.

5. The device of claim 1, wherein the inner-shell closeable opening is in a closed state and the inner shell contains ice cream mixture.

6. The device of claim 5, wherein the outer shell contains ice and salt.

7. The device of claim 1, wherein the flexible inner shell is made from a foodsafe material.

8. The device of claim 1, wherein the flexible inner shell is disposable.

9. The device of claim 1, wherein the flexible inner shell is made of polyethylene.

10. The device of claim 1, wherein the outer-shell closeable opening comprises a female threaded receiver, and the outer shell further comprises a male threaded cap that is complementary to the female threaded receiver.

11. A device for making ice cream, comprising:
    an outer shell comprising an outer-shell closeable opening; and
    a flexible inner shell comprising an inner-shell closeable opening;

wherein:
    the outer-shell closeable opening is independent from the inner-shell closeable opening such that interior space of the outer shell is accessible for inserting contents that are in physical contact with the inner surface of the outer shell and the outer surface of the inner shell;
    the inner-shell closeable opening is in a closed state and the inner shell contains ice cream mixture;
    the outer shell is configured to be sufficiently large to enclose the entirety of the inner shell when the outer-shell closeable opening is in a closed state;
    the outer shell and inner shell are configured so that when the inner shell is entirely enclosed in the outer shell and the outer shell is in a closed state, at least one point on the inner shell is not in a fixed location relative at least one point on the outer shell; and
    the outer-shell closeable opening is in a closed state and the outer shell contains ice and salt in physical contact with the inner surface of the outer shell.

\* \* \* \* \*